(12) United States Patent
Hisatsugu

(10) Patent No.: US 9,671,879 B2
(45) Date of Patent: Jun. 6, 2017

(54) SEARCH CONTROLLER AND SEARCH MANIPULATION SYSTEM

(71) Applicant: DENSO CORPORATION, Kariya, Aichi-pref. (JP)

(72) Inventor: Shinsuke Hisatsugu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/770,938

(22) PCT Filed: Feb. 4, 2014

(86) PCT No.: PCT/JP2014/000567
§ 371 (c)(1),
(2) Date: Aug. 27, 2015

(87) PCT Pub. No.: WO2014/132564
PCT Pub. Date: Sep. 4, 2014

(65) Prior Publication Data
US 2016/0011680 A1 Jan. 14, 2016

(30) Foreign Application Priority Data

Feb. 28, 2013 (JP) ................................ 2013-038364

(51) Int. Cl.
*G09G 5/00* (2006.01)
*G06F 3/0362* (2013.01)
(Continued)

(52) U.S. Cl.
CPC ............ *G06F 3/0362* (2013.01); *G06F 3/016* (2013.01); *G06F 3/0227* (2013.01);
(Continued)

(58) Field of Classification Search
CPC .... G06F 3/033; G06F 3/03549; G06F 3/0362; G06F 3/041; G06F 3/0412; G06F 3/044; G06F 3/045; G06F 3/04847
(Continued)

(56) References Cited

U.S. PATENT DOCUMENTS 6,259,432 B1 * 7/2001 Yamada ................. G06F 3/038
345/159
7,173,637 B1 * 2/2007 Hinckley .............. G06F 3/0362
345/684
(Continued)

FOREIGN PATENT DOCUMENTS

JP H11272406 A 10/1999
JP 2000249568 A 9/2000
(Continued)

OTHER PUBLICATIONS

International Search Report and Written Opinion (in Japanese with English Translation) for PCT/JP2014/000567, mailed May 13, 2014; ISA/JP.

*Primary Examiner* — Alexander Eisen
*Assistant Examiner* — Nelson Lam
(74) *Attorney, Agent, or Firm* — Harness, Dickey & Pierce, P.L.C.

(57) ABSTRACT

A controller is applied to a search manipulation system that allows a user to manipulate a dial and thereby specify a search direction and a search speed when sequentially searching several display objects for a targeted display object. The controller determines that a sudden reverse manipulation occurs when the dial is reversely manipulated to reverse the search direction at a reverse manipulation speed higher than or equal to a specified speed. When determining that the sudden reverse manipulation occurs, the controller performs a search at a search speed lower than
(Continued)

a speed used for a search during which no sudden reverse manipulation occurs.

6 Claims, 8 Drawing Sheets

(51) Int. Cl.
    *G06F 3/0485*     (2013.01)
    *G11B 27/34*     (2006.01)
    *G11B 27/00*     (2006.01)
    *G06F 3/01*     (2006.01)
    *G06F 3/02*     (2006.01)
    *G06F 3/0481*     (2013.01)

(52) U.S. Cl.
    CPC ........ *G06F 3/0485* (2013.01); *G06F 3/04817* (2013.01); *G11B 27/005* (2013.01); *G11B 27/34* (2013.01)

(58) Field of Classification Search
    USPC .......................................... 345/156–179, 184
    See application file for complete search history.

(56) References Cited

U.S. PATENT DOCUMENTS

| | | | |
|---|---|---|---|
| 2003/0058217 A1* | 3/2003 | Hosomizu | G06F 3/038 345/156 |
| 2003/0128192 A1 | 7/2003 | van Os | |
| 2005/0122806 A1 | 6/2005 | Arakawa et al. | |
| 2006/0033721 A1* | 2/2006 | Woolley | G06F 3/044 345/173 |
| 2006/0038784 A1* | 2/2006 | Hinckley | G06F 3/0362 345/163 |
| 2010/0058223 A1* | 3/2010 | Price | G06F 3/0362 715/784 |
| 2010/0231546 A1 | 9/2010 | Digon | |

FOREIGN PATENT DOCUMENTS

| | | |
|---|---|---|
| JP | 2003348505 A | 12/2003 |
| JP | 2004040352 A | 2/2004 |
| JP | 2005532607 A | 10/2005 |
| JP | 2007049552 A | 2/2007 |
| JP | 2007298646 A | 11/2007 |
| JP | 2011505045 A | 2/2011 |
| JP | 2011123156 A | 6/2011 |

* cited by examiner

| CURRENT \ PREVIOUS | | [−] BACKWARD | | | ZERO | [+] FORWARD | | |
|---|---|---|---|---|---|---|---|---|
| | | −θ3 – −θ2 | −θ2 – −θ1 | −θ1 – 0 | 0 | 0 – θ1 | θ1 – θ2 | θ2 – θ3 |
| [−] BACKWARD | −θ3 – −θ2 | −3 | −3 | −3 | −3 | −2.5 | −2.5 | −2.5 |
| | −θ2 – −θ1 | −2 | −2 | −2 | −2 | −1.5 | −1.5 | −1.5 |
| | −θ1 – 0 | −1 | −1 | −1 | −1 | −0.5 | −0.5 | −0.5 |
| ZERO | | 0 | 0 | 0 | 0 | 0 | 0 | 0 |
| [+] FORWARD | 0 – θ1 | 0.5 | 0.5 | 0.5 | 1 | 1 | 1 | 1 |
| | θ1 – θ2 | 1.5 | 1.5 | 1.5 | 2 | 2 | 2 | 2 |
| | θ2 – θ3 | 2.5 | 2.5 | 2.5 | 3 | 3 | 3 | 3 |

D2    D1

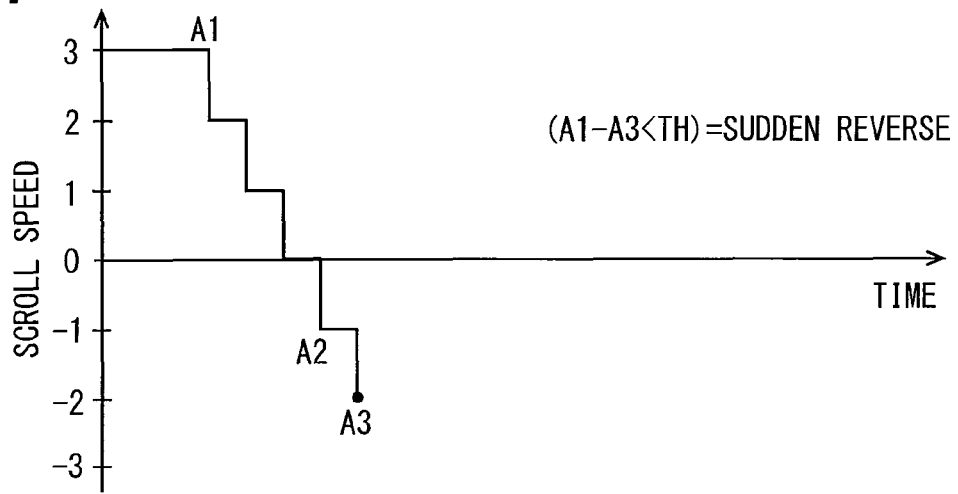
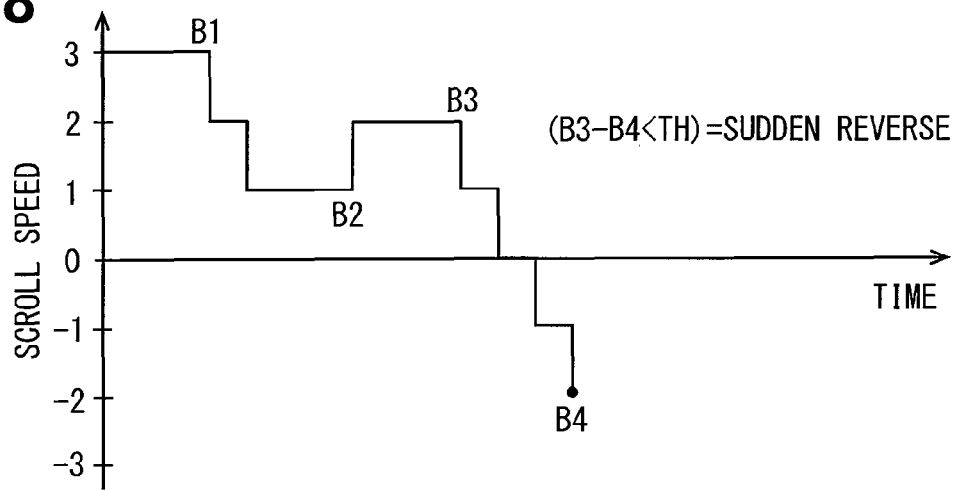
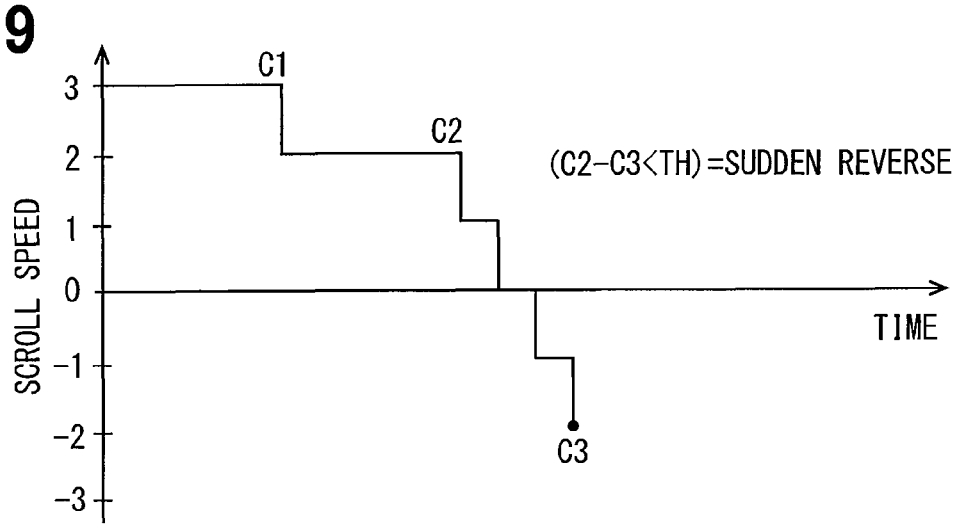

SEARCH CONTROLLER AND SEARCH MANIPULATION SYSTEM

CROSS REFERENCE TO RELATED APPLICATIONS

This application is a U.S. National Phase Application under 35 U.S.C. 371 of International Application No. PCT/JP2014/000567 filed on Feb. 4, 2014 and published in Japanese as WO 2014/132564 A1 on Sep. 4, 2014. This application is based on and claims the benefit of priority from Japanese Patent Application No. 2013-038364 filed on Feb. 28, 2013. The entire disclosures of all of the above applications are incorporated herein by reference.

TECHNICAL FIELD

The present disclosure relates to a search controller and a search manipulation system including the search controller that searches several display objects displayed on a display apparatus for a targeted display object.

BACKGROUND ART

Patent Literature 1 discloses a search manipulation system that sequentially searches several icons (display objects) displayed on a display apparatus for a targeted icon based on a user manipulation on a jog dial (manipulation member). The system sequentially focuses on the selected icons according to a search direction corresponding to the manipulation direction to rotate the jog dial and a search speed corresponding to the manipulation amount of jog dial rotation.

A targeted icon may be located distantly from a currently selected icon (selected icon) in the forward direction. In this case, a user is supposed to manipulate a jog dial as follows. The user rotates the jog dial in the forward direction from a reference position (zero position) to move the selected icon in the forward direction. The user then slightly returns the jog dial toward the zero position to speed down the forward movement of the selected icon. The user then returns the jog dial to the zero position when the selected icon matches the targeted icon, permitting the moving selected icon to stop at the position corresponding to the targeted icon to enable execution of a process associated with the icon.

PRIOR ART LITERATURES

Patent Literature

Patent Literature 1: JP 2000-249568 A

SUMMARY OF INVENTION

The moving selected icon may pass through the position of the targeted icon if the user misses a time point to return the jog dial to the zero position while searching for a targeted icon. In this case, the user reversely rotates the jog dial in the backward direction (reverse manipulation) with reference to the zero position. The user returns the jog dial to the zero position when the backward moving selected icon matches the targeted icon.

The user may suddenly perform reverse manipulation when the selected icon passes through the targeted icon. The amount of backward rotation may be too large. In such a case, the selected icon may pass through the targeted icon in the backward direction. The user may need to repeat the reverse manipulation.

The present disclosure has an object to provide a search controller and a search manipulation system capable of reducing a possibility of repeating reverse manipulation.

To achieve the object, an example of the disclosure provides a search controller as follows. The search controller is applied to a search manipulation system that allows a user to manipulate a manipulation member and thereby instruct a search direction and a search speed while searching display objects for a targeted display object.

The search controller includes a determination device, a normal control device, and a low-speed control device. The determination device determines that a sudden reverse manipulation is applied to the manipulation member when a reverse manipulation is applied to the manipulation member to reverse the search direction at a reverse manipulation speed that is higher than or equal to a specified speed. The normal control device performs a search at a search speed corresponding to an actual manipulation amount when the sudden reverse manipulation is determined not to occur. The low-speed control device performs a search at a search speed lower than a speed of the normal control device when the sudden reverse manipulation is determined to occur.

Thus, a search speed lower than that of a normal control device is used for a search when sudden reverse manipulation occurs. During a forward search, a user may allow a selected display object to pass through a position of a targeted display object and perform reverse manipulation in an excessive manipulation amount. Even in such a case, the search is performed in the backward direction at a search speed lower than that used for normal manipulation. One-time reverse manipulation can select a targeted display object to help prevent a situation of repeating the reverse manipulation.

BRIEF DESCRIPTION OF DRAWINGS

The above and other objects, features and advantages of the present disclosure will become more apparent from the following detailed description made with reference to the accompanying drawings. In the drawings:

FIG. 7 is a diagram illustrating scroll speed transition as an example of sudden reverse manipulation;

FIG. 8 is a diagram illustrating scroll speed transition as an example of sudden reverse manipulation;

FIG. 9 is a diagram illustrating scroll speed transition as an example of sudden reverse manipulation.

DESCRIPTION OF EMBODIMENTS

The following describes embodiments of installing a search controller and a search manipulation system according to the disclosure on a vehicle with reference to the accompanying drawings.

(First Embodiment)

Figure 1:
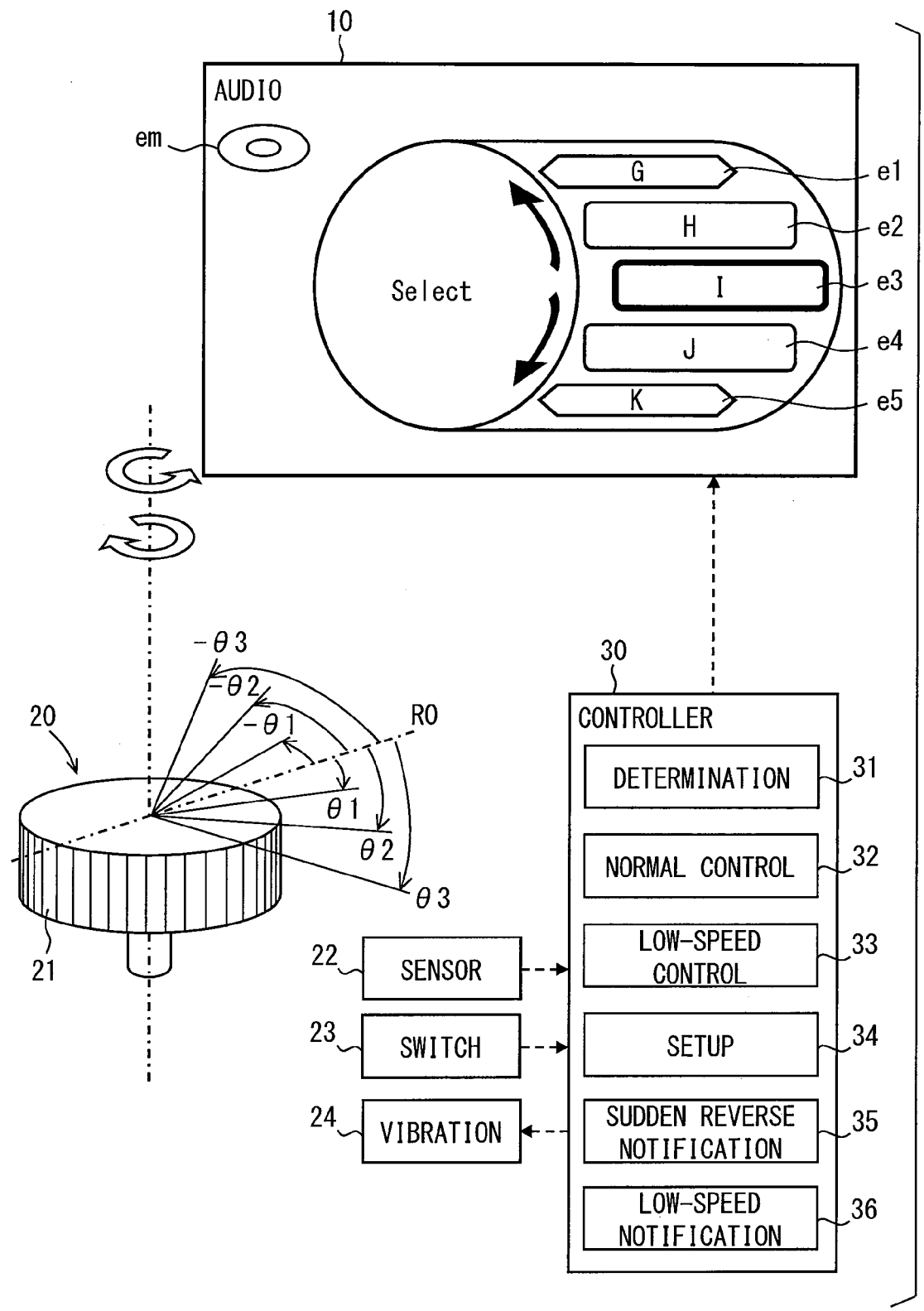
FIG. 1 a block diagram schematically illustrating a search manipulation system according to a first embodiment of the disclosure.

As illustrated in FIG. 1, the search manipulation system includes a display apparatus 10, a manipulation apparatus 20, and a controller 30. The display apparatus 10 is attached to an instrument panel installed in a vehicle compartment. The manipulation apparatus 20 is installed on the instrument panel or a steering wheel between a driver's seat and a passenger seat.

The display apparatus 10 displays the contents of manipulation on the manipulation apparatus 20. The display content is controlled based on an instruction signal output from the controller 30. A user (vehicle occupant) manipulates the manipulation apparatus 20 to control operation of various apparatuses such as an audio system, an air conditioner, and a navigation system mounted on the vehicle. The search manipulation system can be switched between an audio mode (first mode) to manipulate operation of the audio system, an air conditioner manipulation mode (second mode) to manipulate operation of the air conditioner, and a navigation mode (third mode) manipulate operation of the navigation system.

Display portion em of the display apparatus 10 displays a selected mode. In FIG. 1, the display portion em displays that the audio mode is selected. Display portions e1, e2, e3, e4, and e5 (to be described) display icons G, H, I, J, and K corresponding to tune names.

Icons G, H, I, J, and K correspond to display objects that represent predetermined process contents. Suppose the display object represents a tune name in the audio mode. In this case, the predetermined process content signifies that the audio system outputs the music corresponding to the selected tune name.

The manipulation apparatus 20 includes a dial 21, a sensor 22, a switch 23, and a vibration motor 24. The user rotates the dial 21. The sensor 22 detects a rotative manipulation amount and a rotative manipulation direction of the dial 21. The user presses the switch 23. The vibration motor 24 vibrates the dial 21. The sensor 22 and the switch 23 output detection signals that are input to the controller 30.

The dial 21 can be rotated in two directions, namely, clockwise (forward direction) and counterclockwise (backward direction) against reference position R0 (zero position). Forward rotating the dial 21 from reference position R0 applies elastic force of an unshown elastic member to the dial 21 in the backward direction. Similarly, backward rotating the dial 21 from reference position R0 applies the elastic force in the forward direction. When the user releases his or her hand from the dial 21, the elastic force returns the dial 21 to the reference position R0. Increasing the amount of manipulation to rotate the dial 21 increases the elastic deformation and accordingly increases the elastic force.

The controller 30 includes a known microcomputer containing a central processing unit and memory. The microcomputer controls display contents of the display apparatus 10 based on detection signals from the sensor 22 and the switch 23. Rotating the dial 21 scrolls icons G through K displayed on display portions e1 through e5. The controller 30 to control the scroll corresponds to the search controller. As will be described later, the controller 30 includes devices 31 through 36 that are also referred to as sections 31 through 36 or means 31 through 36.

A scroll direction (search direction) depends on the direction to rotate the dial 21. According to the example in FIG. 1, forward rotating the dial 21 scrolls icons G through K clockwise (downward). Display portion e1 through e5 display icons F, G, H, I, and J. A scroll speed (search speed) depends on the amount of manipulation to rotate the dial 21. Increasing the rotative manipulation amount against reference position R0 increases the scroll speed for display.

Figures 2, 3:
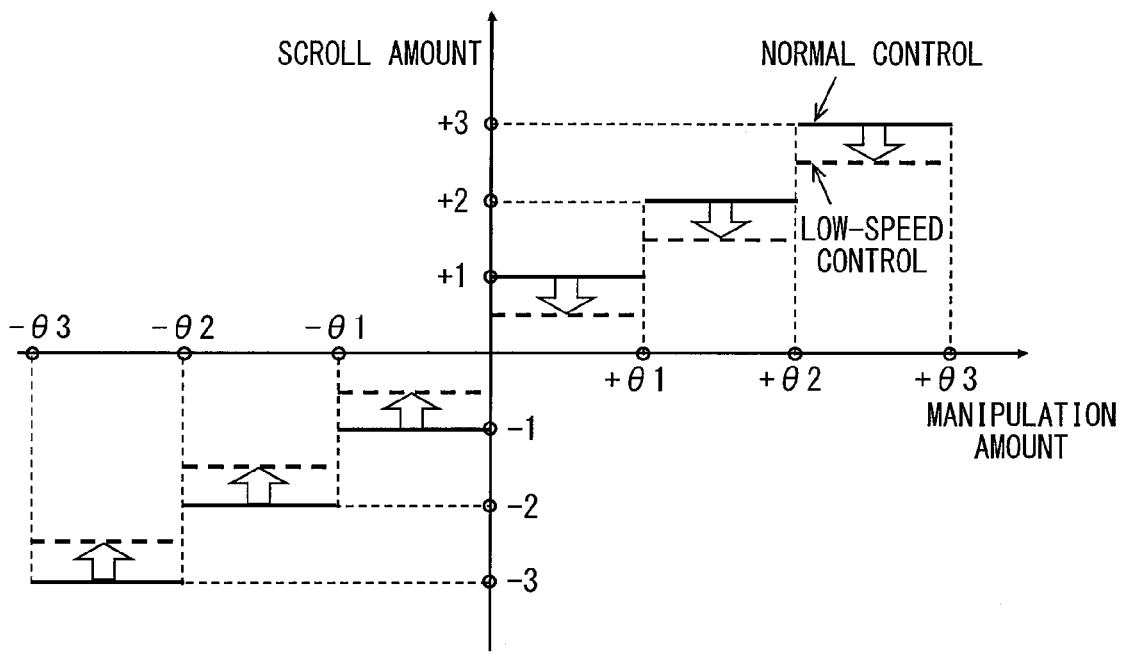
FIG. 2 is a diagram illustrating relationship between a scroll amount and a manipulation amount in terms of normal control and low-speed control according to the first embodiment.
FIG. 3 is a diagram graphically illustrating the relationship between a scroll amount and a manipulation amount.

FIG. 2 is a table illustrating relationship between the rotative manipulation amount and the rotation direction of the dial 21 and relationship between the scroll direction and the scroll speed of the display apparatus 10. The leftmost column of the table contains currently detected rotative manipulation amounts and rotation directions. The other columns of the table contain rotative manipulation amounts and rotation directions that are detected most recently or a predetermined time interval ago. In FIG. 2, reference symbols $\theta1, \theta2, \theta3, -\theta1, -\theta2$, and $-\theta3$ correspond to the rotation angles in FIG. 1 and maintain magnitude relationships $\theta1<\theta2<\theta3$ and $|-\theta1|<|-\theta2|<|-\theta3|$. A numeric value in the table denotes a scroll speed, namely, a scroll amount (numerically represented increasing and decreasing amount) per unit time. For example, scroll speed 3 scrolls three icons per unit time.

The sudden reverse manipulation (to be described) is assumed to occur if the rotation direction detected the predetermined time interval ago differs from the currently detected rotation direction. A shaded cell in FIG. 2 denotes a scroll speed value when the sudden reverse manipulation is assumed. The other cells contain scroll speed values when no sudden reverse manipulation is assumed.

According to FIG. 2, the previous manipulation rotates the dial ranging from 0 to $\theta1$ in the forward direction. From this state, forward rotating the dial ranging from $\theta1$ to $\theta2$ forward scrolls two icons per unit time as denoted by reference symbol D1 in FIG. 2. The scroll occurs to display icons E, F, G, H, and I to transition from the state of displaying icons G, H, I, J, and K in FIG. 1.

In contrast, the previous manipulation may backward rotate the dial ranging from $-\theta1$ to 0 and then forward rotate the dial ranging from $\theta1$ to $\theta2$ as the reverse manipulation. In this case, one icon is forward scrolled per unit time as denoted by reference symbol D2 in FIG. 2. The scroll occurs to display icons F, G, H, I, and J to transition from the state of displaying icons G, H, I, J, and K in FIG. 1.

If no sudden reverse manipulation occurs, the controller 30 provides display control (normal control) to activate scrolling at a scroll speed (2 denoted by D1) corresponding to the actual manipulation amount on the dial 21. If the sudden reverse manipulation occurs, the controller 30 provides display control (low-speed control) to activate scrolling at a scroll speed (1 denoted by D2) lower than the normal control.

The microcomputer corresponds to a determination device 31 in FIG. 1 when the microcomputer determines whether or not the sudden reverse manipulation occurs. The microcomputer corresponds to a normal control device 32 in FIG. 1 when the microcomputer provides the normal control. The microcomputer corresponds to a low-speed control device 33 in FIG. 1 when the microcomputer provides the low-speed control.

FIG. 3 graphically illustrates FIG. 2. A solid line in the drawing represents relationship between the scroll speed (scroll amount) and the manipulation amount when the normal control is provided. A region containing positive manipulation amount values represents the forward manipulation. A region containing negative manipulation amount values represents the backward manipulation. The example in FIG. 3 configures the scroll amount (numerically represented increasing and decreasing amount) under the normal control in three levels correspondingly to the rotative manipulation amount. Each scroll amount is reduced by a specified amount under the low-speed control.

Figure 4A:
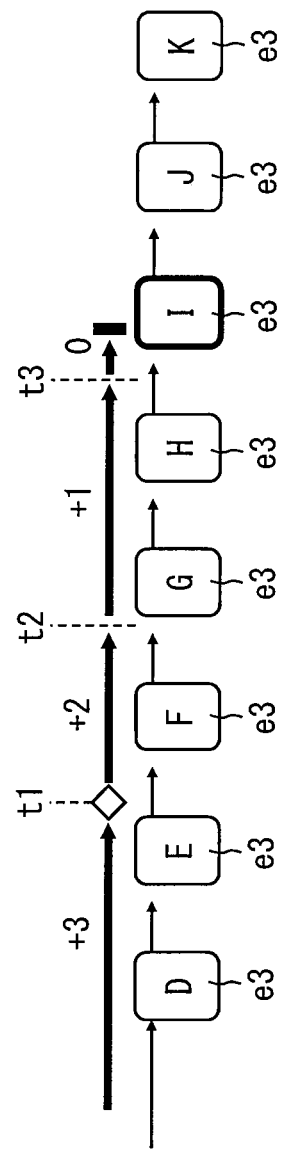
FIG. 4A is a diagram illustrating an example of display mode under scroll display control.
Figure 4B:
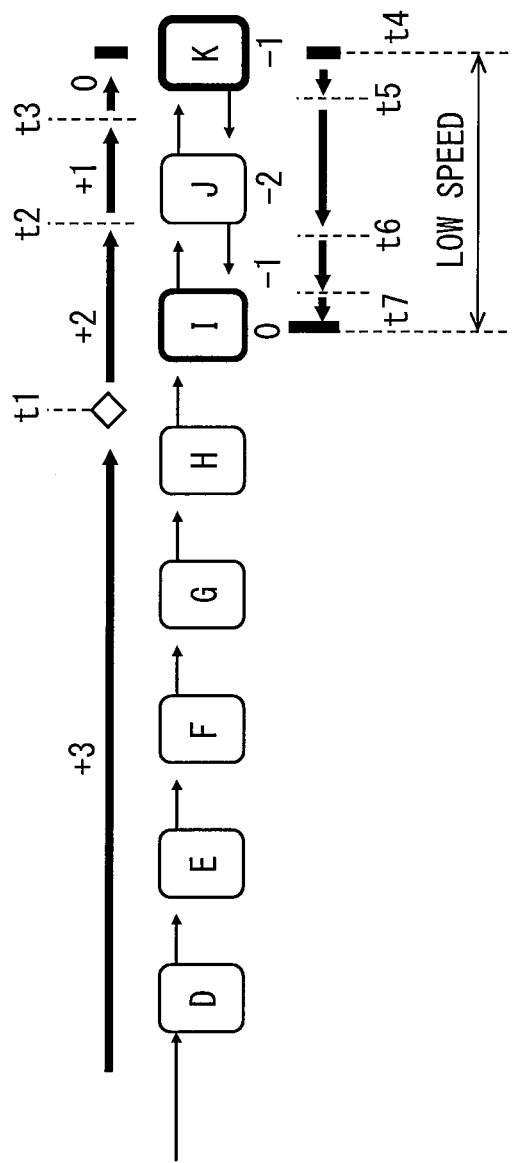
FIG. 4B is a diagram illustrating another example of display mode under scroll display control.
Figure 4C:
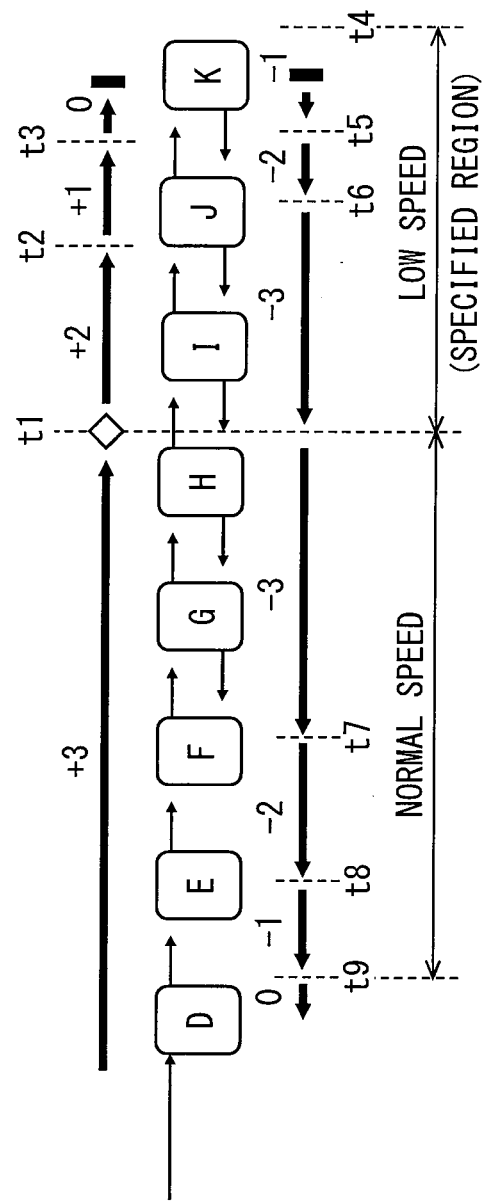
FIG. 4C is a diagram illustrating still another example of display mode under scroll display control.

With reference to FIGS. 4A, 4B, and 4C, the following describes display mode examples when the scroll display control is provided based on the settings in FIGS. 2 and 3. FIGS. 4A, 4B, and 4C illustrate how an icon (selected icon or selected display object) displayed on a display portion e3 transitions as the user manipulates the dial.

As illustrated in FIG. 4A, icon I is targeted (targeted icon or targeted display object) and icon A (not illustrated in FIG. 4A) was selected before the search. In this case, the user intends to search for icon I. The user starts manipulating the dial backward from selected icon A, passes through icons B and C, then further passes through icons D to H as illustrated in FIG. 4A, and finally reaches icon I.

In this example, the user first manipulates the dial backward at speed 3. At time t1 immediately after the selected icon changes to E, the user decreases the amount of dial rotation and manipulates the dial backward at speed 2. At time t2 immediately after the selected icon changes to F, the user further decreases the amount of dial rotation and manipulates the dial backward at speed 1. At time t3 immediately after the selected icon changes to H, the user manipulates the dial 21 to reach the zero position and stops scrolling while display portion e3 displays icon I.

Thus the user desirably decreases the rotation amount gradually to decrease the speed without delaying time t1 to return the dial 21 to zero from the state scrolling at speed 3 towards zero. This allows the user to select targeted icon I without needing for the reverse manipulation.

In FIG. 4B, similarly to FIG. 4A, the user manipulates the dial backward at speed 3 toward targeted icon I. At time t1 immediately after the selected icon changes to H, the user decreases the dial rotation amount and manipulates the dial backward at speed 2. At time t2 immediately after the selected icon changes to I, the user further decreases the dial rotation amount and manipulates the dial backward at speed 1. At time t3 immediately after the selected icon changes to J, the user manipulates the dial 21 to reach the zero position. At time t4, the user manipulates the dial forward at speed 1. At time t5, the user manipulates the dial forward at speed 2. At time t6, the user manipulates the dial forward at speed 1. The user stops scrolling at time t7 when display portion e3 displays icon I. In fact, time t1 may be referable to the time point of starting the reverse manipulation enabling to select targeted icon I after actually reversing the scroll direction.

Figure 5:
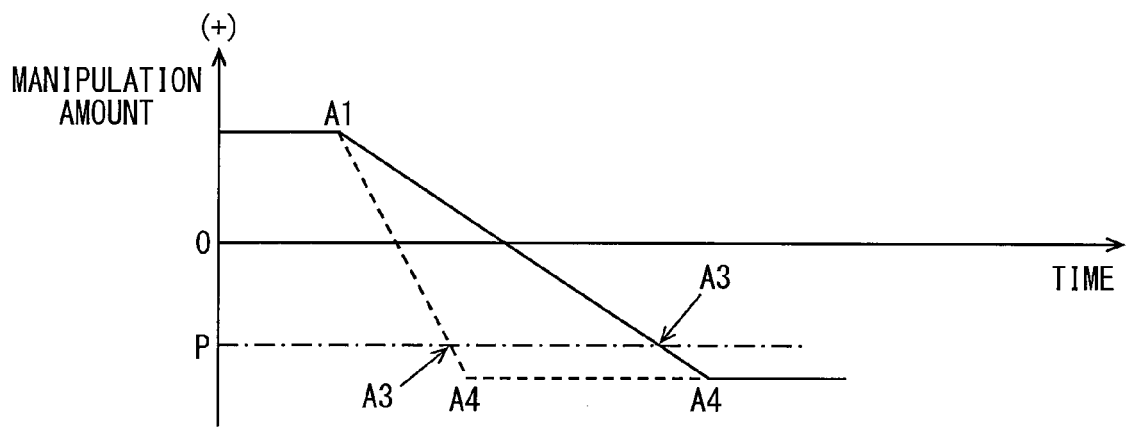
FIG. 5 is a diagram illustrating a difference between sudden reverse manipulation and reverse manipulation according to the first embodiment.

According to the example in FIG. 4B, the reverse manipulation is determined to be the sudden reverse manipulation that requires a dial rotation speed higher than or equal to the specified speed. This determination is performed at time t4. The low-speed control is applied to the scroll at time t4 and later. FIG. 5 illustrates chronological changes in the manipulation amount when the reverse manipulation occurs to change the scrolling from forward to backward. A solid line in the drawing represents the reverse manipulation at a speed lower than the specified speed. A broken line in the drawing represents the reverse manipulation (sudden reverse manipulation) at a speed higher than or equal to the specified speed.

The controller 30 provides sudden-reverse icon notification control to notify an icon in response to the sudden reverse manipulation described below while the controller 30 performs the low-speed control caused by the sudden reverse manipulation. The controller 30 displays either (i) selected icon I at time t1 referable to the time point of starting the sudden reverse manipulation or (ii) icons (such as H through J, I through K, or H through K) containing selected icon I belonging to a specified region, in a highlighted display format different from that for the other icons. For example, the highlighted display format blinks icons H, I, and J in the specified region, light the icons in different colors, or displays the icons to be decorated. The microcomputer corresponds to a sudden reverse notification device 35 in FIG. 1 when the microcomputer controls the display in this manner.

The controller 30 provides low-speed search notification control to notify the user of a search under low-speed control when the controller 30 provides the low-speed control in response to the sudden reverse manipulation. During the low-speed control, for example, the controller 30 generates a notification sound, generates a speech, or vibrates the dial 21. The microcomputer corresponds to a low-speed notification device 36 in FIG. 1 when the microcomputer controls the display in this manner.

FIG. 4C provides a display example where icon A is selected (unshown in FIG. 4A). The user searches icons up to K while the targeted icon is indeterminate. The user selects targeted icon D from the searched icons A through K and manipulates the dial according to the reverse manipulation to return to icon D.

In this example, the user first manipulates the dial backward at speed 3. The user then manipulates the dial backward at speed 2 at time t1, backward at speed 1 at time t2, and to the zero position at time t3. The user then manipulates the dial forward at speed 1 at time t4, forward at speed 2 at time t5, forward at speed 3 at time t6, forward at speed 2 at time t7, forward at speed 1 at time t8, and displays icon D on display portion e3 at t9 to stop scrolling. In fact, time T1 may be referable to the time point of starting the reverse manipulation enabling to select targeted icon D after actually reversing the scroll direction.

The reverse manipulation according to the example in FIG. 4C is determined to be sudden reverse manipulation at the specified speed or higher. This determination is performed at time t4. The low-speed control is applied to the scroll at time t4 and later to enable the forward scroll; the low-speed control is then switched to the normal control when the forward scroll exceeds the scroll position was passed at time t1 of starting the reverse manipulation.

That is, icon I, which was displayed on display portion e3 at time t1 of starting the sudden reverse manipulation, is settled as a specified icon (specified display object). The specified region is settled in the backward direction from specified icon I. After time t4 to reverse the scroll display, the scroll display following the low-speed control until takes place until the time point when the icon displayed on display portion e3 exceeds the specified region and changes to icon I. From this time point on, the scroll display follows the normal control.

Figure 6:
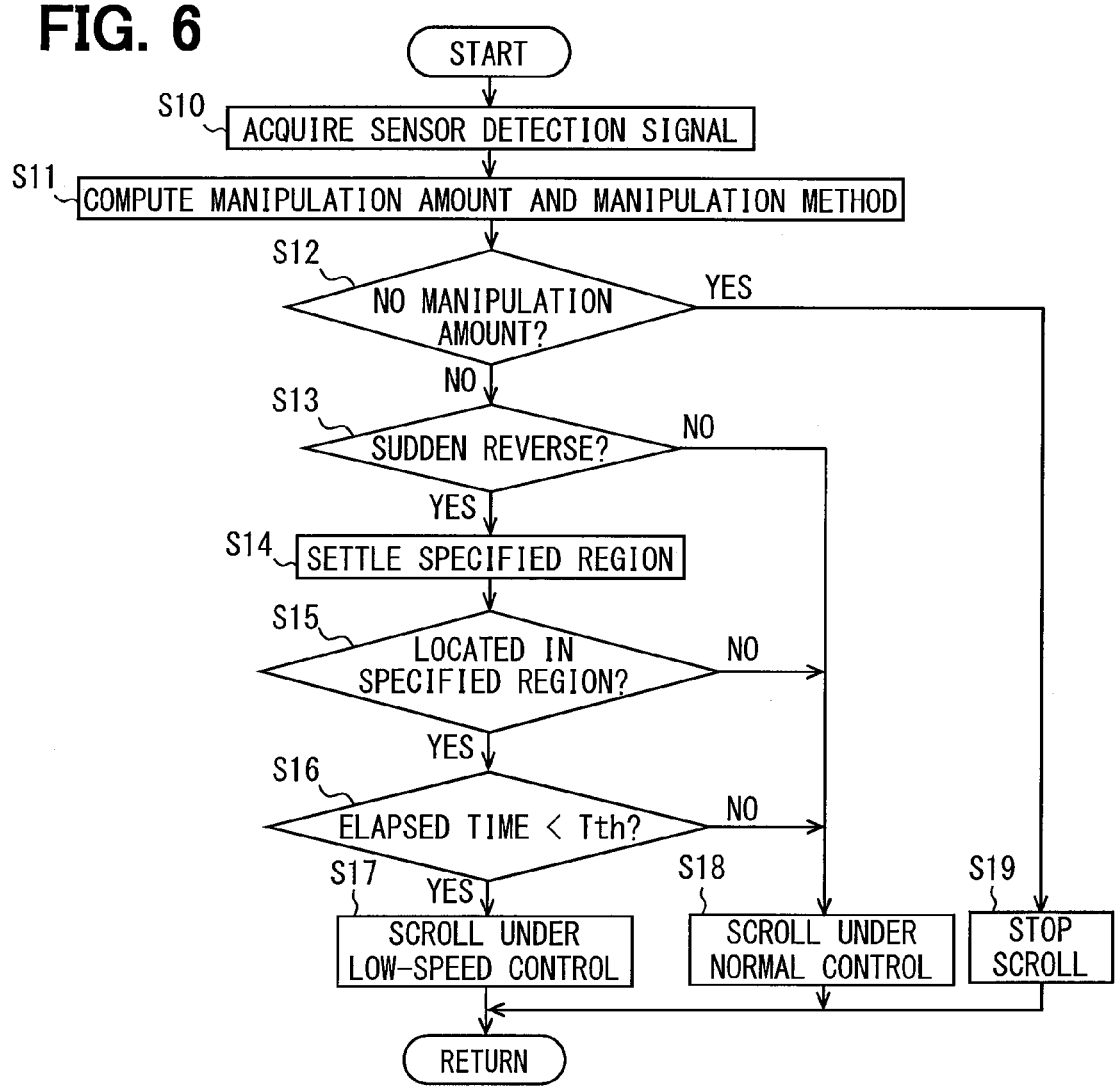
FIG. 6 is a flowchart illustrating a scroll control procedure according to the first embodiment.

FIG. 6 is a flowchart illustrating a process the microcomputer included in the controller 30 performs to provide the normal control and the low-speed control. The process is performed repeatedly at a specified time interval.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

At S10 in FIG. 6, the microcomputer acquires a detection signal output from the sensor 22. At S11, the microcomputer computes a manipulation amount and a manipulation direction of the dial 21 based on the acquired detection signal. At S12, the microcomputer determines whether or not the computed manipulation amount is zero. The microcomputer proceeds to S13 if the manipulation amount is not zero (S12: NO). The microcomputer determines whether or not the sudden reverse manipulation occurs, based on a history of calculated manipulation amounts and directions. The determination device 31 in FIG. 1 performs this determination.

The manipulation amount changes as illustrated in FIG. 5. In this case, the microcomputer computes the time from time A1 to time A3. The reverse manipulation starts at time A1. The manipulation amount after the reversal reaches specified amount P at time A3. If the measured time between A1 and A3 is smaller than threshold value TH, the microcomputer assumes the reverse manipulation speed to be higher than or equal to a specified speed and determines that the sudden reverse manipulation occurs. FIG. 7 illustrates changes in the scroll speed when the manipulation amount is changed as indicated by the broken line in FIG. 5. Specified amount P corresponds to an absolute value of $-\theta 1-\theta 2$.

According to the example in FIG. 7, the manipulation from time A1 is identified as the reverse manipulation at time A2 for the first time. The reverse manipulation is identified as the sudden reverse manipulation at time A3 for the first time. Specified amount P may be defined as $-\theta 1-\theta 2-\theta 3$. The sudden reverse manipulation may be identified when the time between A1 and A3 is smaller than threshold value TH.

FIGS. 5 and 7 illustrate examples of sudden reverse manipulation when the manipulation continuously decreases the scroll speed from time A1. According to an example in FIG. 8, the scroll speed decreases from time B1 to time B2, then increases, and decreases again from time B3. The scroll direction reverses thereafter. In this case, the microcomputer computes the time from time B3 to time B4. The scroll speed finally starts decreasing from time B3 on. The manipulation amount after the direction reversal reaches specified amount P at time B4. If the measured time between B3 and B4 is smaller than threshold value TH, the microcomputer assumes the reverse manipulation speed to be higher than or equal to a specified speed and determines that the sudden reverse manipulation occurs. The user may reverse the manipulation while repeatedly increasing and decreasing the scroll speed. In such a case, the microcomputer determines the sudden reverse manipulation based on the time required from the time to finally start the reverse manipulation to the time to manipulate the dial by a specified manipulation amount after the reversal.

According to an example in FIG. 9, the reverse manipulation occurs so that the scroll speed decreases slowly from time C1 to time C2 and decreases fast from time C2. In this case, the determination is applicable to part of the history of scroll speed changes where the scroll speed changes within a specified time at time C2 and later. The determination is inapplicable to part of the history of scroll speed changes where the scroll speed does not change between time C1 and time C2. The example in FIG. 9 measures the time from time C2 to time C3 when the manipulation amount after the direction reversal reaches specified amount P. If the measured time between C2 and C3 is smaller than threshold value TH, the microcomputer assumes the reverse manipulation speed to be higher than or equal to a specified speed and determines that the sudden reverse manipulation occurs. The scroll speed may not change constantly. In such a case, the microcomputer determines the sudden reverse manipulation based on part of the history between C2 and C3 where a changed speed is higher than or equal to the specified speed.

As illustrated in FIGS. 7 through 9, the microcomputer determines whether or not the reverse manipulation occurs suddenly, based on the history of scroll speed changes during a period before and after the time when the scroll direction reverses.

Returning to the flowchart in FIG. 6, the microcomputer proceeds to S14 if the sudden reverse manipulation occurs (S13: YES). The microcomputer settles the specified region as illustrated in FIG. 4C based on the icon that was displayed on display portion e3 when the sudden reverse manipulation started, namely, the specified icon that was selected when the sudden reverse manipulation started. In this case, the microcomputer functions as a setup device 34 in FIG. 1. The example in FIG. 4C settles the specified region at the backward side (the scrolling side before the reversal) of specified icon I. However, the specified region just needs to contain specified icon I. The specified region may be extended to the forward side (the scrolling side after the reversal) of specified icon I to cover the backward side of icon G, for example.

At S15, the microcomputer determines whether or not the currently selected icon displayed on display portion e3 is located in the specified region settled at S14. If the icon is located in the specified region (S15: YES), the microcomputer proceeds to S16 and determines whether or not the time elapsed from the time to start the sudden reverse manipulation is shorter than specified time. If the elapsed time is shorter than the specified time (S16: YES), the microcomputer proceeds to S17 and applies the low-speed control to the scroll.

The time elapsed from the time to start the sudden reverse manipulation may be longer than or equal to the specified time (S16: NO). The currently selected icon may be located outside the specified region (S15: NO). Alternatively, the sudden reverse manipulation may not occur (S13: NO). In such a case, the microcomputer proceeds to S18 and applies the normal control to the scroll.

The map in FIG. 2 determines the scroll direction and the scroll speed under display control at S17 and S18 based on the current manipulation amount and manipulation direction computed at S11. If the manipulation amount is determined to be zero at S12, the microcomputer proceeds to S19 and stops the scroll.

The first embodiment includes the following features. The features produce function effects described below.

<Feature 1>

The determination device 31 and the low-speed control device 33 are included. The sudden reverse manipulation activates the low-speed control to scroll at a scroll speed (search speed) lower than that under the normal control. As illustrated in FIG. 4B, the sudden reverse manipulation reverses the scroll direction to scroll at a speed lower than that resulting from the actual manipulation amount. One-time reverse manipulation can select a targeted icon to help prevent a situation of repeating the reverse manipulation.

<Feature 2>

An icon searched at the time to start the sudden reverse manipulation is defined as a specified icon. The specified region is settled to contain at least the specified icon as well as the other icons. The low-speed control changes to the normal control when the selected icon leaves the specified region where the low-speed control takes place. As illustrated in FIG. 4C, the sudden reverse manipulation aims at selecting a targeted icon at a position far backward from the scroll position at the time to start the reverse manipulation. In this case, the scroll speed returns to the speed under the normal control when the selected icon is returned to a position outside the specified region. This can shorten the time to display the targeted icon on display portion e3 and improve the search operability.

<Feature 3>

The low-speed control changes to the normal control when a specified time elapses from time t1 to start the sudden reverse manipulation. As illustrated in FIG. 4C, the sudden reverse manipulation occurs to return the scroll position much and select targeted icon D. In this case, the scroll speed returns to that under the normal control when the specified time elapses. This can shorten the time to display targeted icon D on display portion e3 and improve the search operability.

<Feature 4>

The sudden reverse notification device 35 notifies the user that the specified region contains an icon (specified icon I) selected at the time to start the sudden reverse manipulation or any one of icons A through Z. While the low-speed control is active, the user can select targeted icon I by referencing the content notified from the low-speed control. This can improve operability to select an icon after the sudden reverse manipulation.

<Feature 5>

The low-speed notification device 36 notifies the user that the low-speed control is applied to the search. This can prevent the user from having a feeling of strangeness in a lowered scroll speed.

(Second Embodiment)

Figure 10:
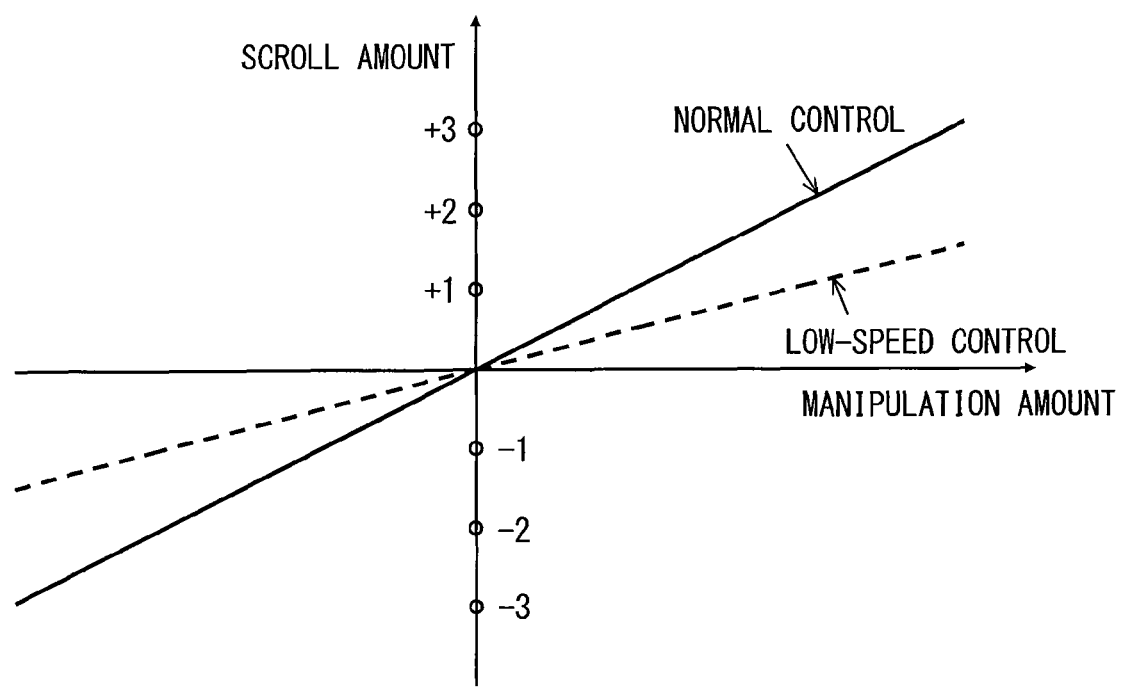
FIG. 10 is a diagram illustrating the relationship between a scroll amount and a manipulation amount according to a second embodiment of the disclosure.

The first embodiment stepwise changes the scroll amount (numerically represented increasing and decreasing amount) in relation to the manipulation amount. As illustrated in FIG. 10, however, the second embodiment gradually changes the scroll amount in relation to the manipulation amount. In FIG. 10, characteristic lines represent the low-speed control and the normal control. The embodiment provides correction so that the characteristic line for the low-speed control indicates a smaller gradient than the characteristic line for the normal control. This can also provide the same effect as the first embodiment.

(Third Embodiment)

The first embodiment can switch between the audio mode (first mode), the air conditioner manipulation mode (second mode), and the navigation mode (third mode). The embodiment uses the same condition to determine whether or not the sudden reverse manipulation occurs, regardless of whatever mode is selected. As indicated by the broken line in FIG. 5, the sudden reverse manipulation is determined to occur under the condition that the reverse manipulation occurs at a speed higher than or equal to the specified speed.

By contrast, the third embodiment uses different conditions to determine whether or not the sudden reverse manipulation occurs, depending on the selected mode. Namely, the embodiment varies the specified speed used for the determination.

In a mode that uses many icons, for example, the sudden reverse manipulation is often likely to occur at a high scroll speed. In such a case, a favorable effect may result from decreasing the specified speed used for the determination and increasing chances to enable the low-speed control. Alternatively, in a mode that uses many icons, a user may be supposed to need the search at a high scroll speed. In such a case, a favorable effect may result from increasing the specified speed used for the determination and decreasing chances to enable the low-speed control.

(Other Embodiments)

The disclosure is not limited to the descriptions of the embodiments but may be modified as follows. Typical configurations of the embodiments may be combined with each other.

The example in FIG. 1 uses the rotatively manipulated dial 21 as a manipulation member. The manipulation member may be manipulated by tilting or rocking. The manipulation member just needs to be manipulated bidirectionally from the reference position. There may be a touch pad that includes a manipulation surface manipulated by a user with his or her finger and detects a change in the electrostatic capacity dependent on a contact state. The touch pad is applicable to the disclosure if the touch pad can reverse the scroll direction in response to the bidirectional manipulation from the reference position.

The specified region settled at S14 in FIG. 6 may correspond to specified icon I only, a region corresponding to icons I and J containing the specified icon, or a region corresponding to icons H, I, and J before and after the specified icon contained.

Notification from the sudden reverse notification device 35 and the low-speed notification device 36 may be inhibited when a specified time interval elapses from the time to start the sudden reverse manipulation.

The display object is not limited to a letter but may be available as a graphics or a symbol if the display object expresses a predetermined process content. The display object may be available as a combination of a letter, a graphics, and a symbol. A graphics or a symbol may be used to express an increase in the air volume in the air conditioner manipulation mode. A letter may be used to express a tune name in the audio mode.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A search controller applicable to a search manipulation system allowing a user to manipulate a manipulation member to specify a search direction and a search speed in sequentially searching a plurality of display objects for a targeted display object, the search controller comprising:

a determination device determining that a sudden reverse manipulation is applied to the manipulation member when a reverse manipulation is applied to the manipulation member to reverse the search direction at a reverse manipulation speed that is higher than or equal to a specified speed;

a normal control device performing a search at a search speed corresponding to an actual manipulation amount when the sudden reverse manipulation is determined not to occur;

a low-speed control device performing a search at a search speed lower than a speed of the normal control device when the sudden reverse manipulation is determined to occur; and a setup device
- settling a specified display object corresponding to a display object searched for at starting time point to start the sudden reverse manipulation and
- settling, of the plurality of display objects, any display object contained in a specified region that contains at least the specified display object, wherein when a display object searched by the low-speed control device leaves the specified region, a search using the low-speed control device is ended to alternatively start a search using the normal control device.

2. The search controller according to claim 1, further comprising:
a sudden reverse notification device notifying a user of any display object out of the display objects that corresponds to either the specified display object or any display object contained in the specified region.

3. The search controller according to claim 1, further comprising:
a low-speed notification device notifying a user that the low-speed control device is used for search.

4. The search controller according to claim 1,
wherein when a specified time elapses from a start of the sudden reverse manipulation during a search using the low-speed control device, a search using the low-speed control device is ended to alternatively start a search using the normal control device.

5. The search controller according to claim 1,
wherein:
the search manipulation system is capable of a search by switching between a first mode and a second mode,
the first mode sequentially searching a plurality of first display objects for a targeted display object,
the second mode sequentially searching a plurality of second display objects for a targeted display object; and
the determination device uses a determination condition to determine whether the sudden reverse manipulation occurs, the determination condition being differentiated between in the first mode and in the second mode.

6. A search manipulation system comprising:
the search controller according to claim 1,
the manipulation member; and
a display apparatus displaying the display object.

* * * * *